United States Patent Office 3,285,262
Patented Nov. 15, 1966

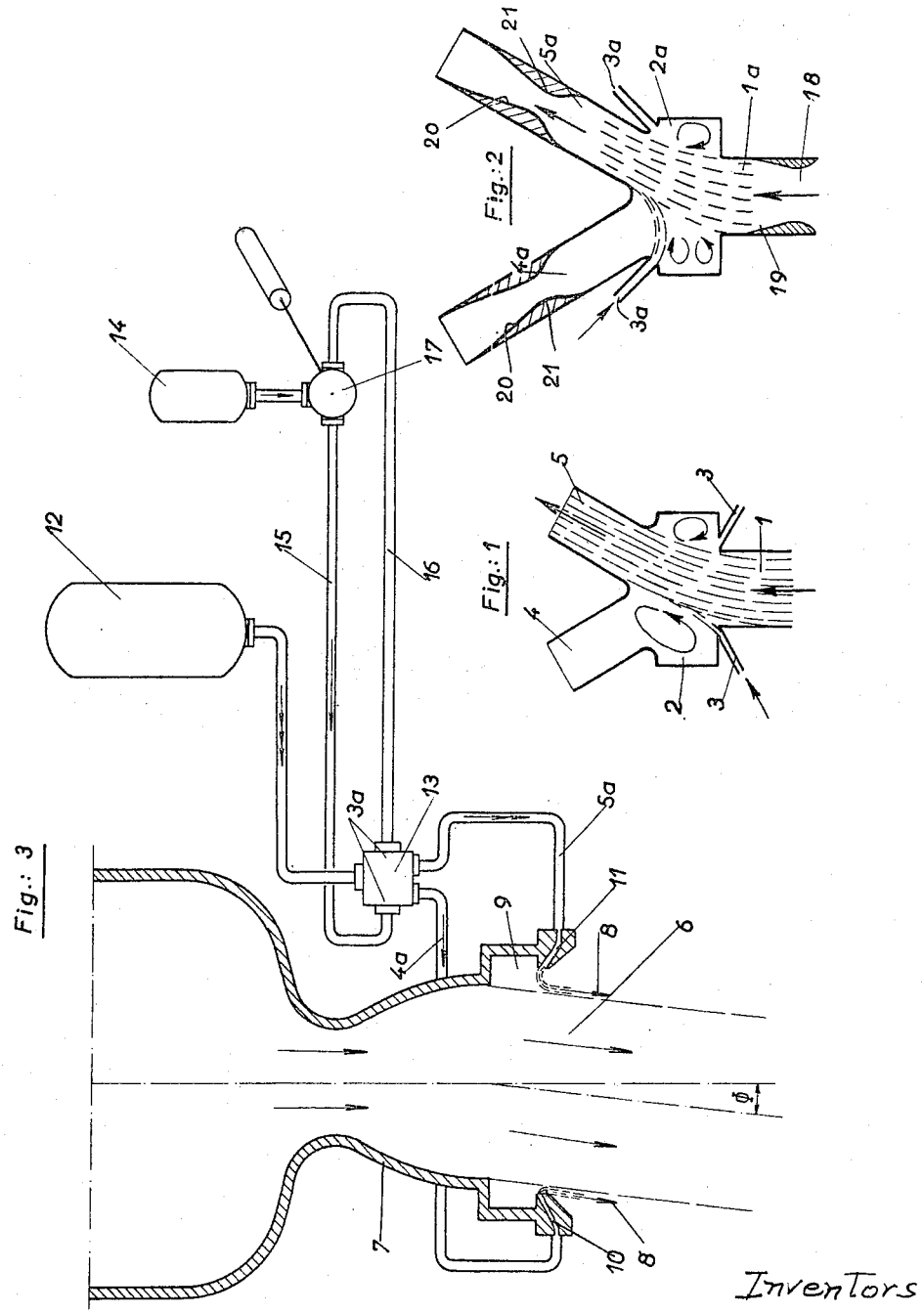

3,285,262
AERODYNAMIC OR HYDRODYNAMIC SERVO-
VALVE, ESPECIALLY FOR USE FOR THE
GUIDANCE AND STABILISATION OF ROCK-
ETS
Adolphe Otton Gontier Ernst, Bois-le-Roi, Jean Paul
Joseph Jardinier, Vitry-sur-Seine, and Janos Rona,
Dammarie-les-Lys, France, assignors to Societe Na-
tionale d'Etude et de Construction de Moteurs d'Avia-
tion, Paris, Seine, France, a company of France
Filed Aug. 2, 1963, Ser. No. 299,495
Claims priority, application France, Aug. 7, 1962,
906,350
2 Claims. (Cl. 137—81.5)

The invention relates to aerodynamically and hydro-dynamically operating servo-valves and it is an object of the invention to provide such a valve which will enable a flow of fluid to be directed selectively towards one or the other of the outlets from a junction. The device provided by the invention is utilisable especially in the supersonic range.

The invention also relates to an amplifier device comprising such servo-valves and to a device for the guidance and stabilisation of rockets, using these servo-valves.

An aerodynamic or hydrodynamic servo-valve is especially advantageous for the distribution or apportionment of hot fluids, especially in the rocket art.

The guidance moments necessary for controlling rockets and for stabilising them on a predetermined trajectory are frequently created by deflection of the jet of the propulsion unit (thrust vector control). In most of the present-day forms of rocket the nozzles of the propulsion unit are movable and the deflection of the jet is effected by the inclination of the nozzles. This solution poses serious technical problems. In fact it is necessary to compromise in order to reduce the friction of the movable nozzle, while at the same time ensuring perfect sealing at very high temperatures. Under these circumstances the energy necessary for the inclination of the nozzles must be taken from an auxiliary power source. In order to avoid these difficulties another method is in the course of development, namely the deflection of the jet by the interposition of "obstacles" at the position of the exit section of fixed nozzles.

These "obstacles" can be solid baffles or they may be constituted by deflector jets, the operation of deflecting the jet being based for example upon the asymetric regulation of the pressures in chambers disposed beyond the outlet of a convergent-divergent nozzle. It is thus necessary to create, in two opposite chambers, an over-pressure and a depression in relation to the exit pressure, the value of which is clearly defined by the generating pressure and by the geometry of the nozzle.

In a device where deflection is effected by a jet, the secondary or deflector jets can be sonic or even supersonic, their effectiveness then being further increased. On the other hand in the case of solid obstacles, the filling of the chamber can be effected by a sub-sonic or sonic jet. In both cases it is necessary to regulate the secondary jets, taken from a suitable source.

The gases utilised for the deflector jets or for creating the pressure in the chambers must be hot and may be taken from or produced by the contrivance itself, or they may be contained in reservoirs transported by the latter. The distribution of the hot gases by valves having movable mechanical members would pose very great difficulties. In fact they would be rapidly put out of action by reason of the erosion caused by the flow at very high temperature and aggravated by a very high speed. On the other hand the aerodynamic servo-valve avoids the drawbacks of the mechanical devices. It permits the control of the deflector jets without the use of movable parts.

The servo-valve according to the invention comprises a deflection chamber in which an incident jet can be intercepted by one and/or the other of two auxiliary jets, at a suitable angle to cause deflection of the said incident jet and to distribute it selectively between two outlet conduits constituting a junction.

Thus the role of this servo-valve is to distribute a gas (or liquid) flow into two different conduits. It represents a bifurcation where the flow is controlled by the intermediary of auxiliary jets. Since the total quantity of fluid delivered by these latter is only a small proportion of the quantity of the flow controlled, an amplification effect is produced and the apparatus is in fact a servo-valve.

According to the construction of the servo-valve, the flow can be two-dimensional or three-dimensional but in order to simplify the construction it is preferable to retain a plane two-dimensional flow, which is always possible if it is a question of a bifurcation, that is to say if the valve constitutes a two-way junction.

The invention will be more fully understood from the following description with reference to the accompanying drawings, given by way of non-limitative example only. Any arrangement appearing either from the text or from the drawings naturally comes within the scope of the invention.

In the drawings:

FIGURE 1 shows a servo-valve according to the invention in longitudinal section;

FIGURE 2 is a view similar to FIGURE 1 but showing another embodiment and

FIGURE 3 is a diagrammatic view illustrating the application of a servo-valve constructed according to the invention, to the deflection of the jet of a rocket.

Referring to the drawings, FIGURE 1 shows an aerodynamic servo-valve with sub-sonic principal flow. At the point where the main jet 1 emerges from the entry conduit into the deflection chamber 2, two auxiliary jets emitted respectively by two pipes 3 can intercept the main jet at a suitable angle to cause a deflection thereof. Without the injection of such auxiliary jets, the principal jet 1 is distributed equally between the two conduits or outlet pipes 4 and 5. As soon as there is a slight delivery of fluid in the form of an auxiliary jet entering the servo-valve, the principal jet is partially deflected, whence there occurs a difference of flow rate in the outlet pipes. As the flow rate of the auxiliary jet increases, for example from the left-hand side, the flow rate into the left-hand pipe 4 diminishes progressively, until the whole of the fluid of the principal jet and of the auxiliary jet issues entirely through the right-hand pipe 5. Thus the outlet 4 is, in effect, blocked and in this manner the linear operation of the aerodynamic servo-valve can be ensured.

It is also possible to cause the servo-valve to operate as a "flip-flap" element to obtain an "on-off" distribution of the incident fluid flow between both outlet pipes 4, 5, i.e. to cause the whole of the fluid of principal and auxiliary jets to issue selectively through either of outlet pipes, by alternating the discharge of the auxiliary jets at a rate which is adapted to the desired rate of selective "on-off" distribution.

FIGURE 2 shows a servo-valve with supersonic principal flow. The jet 1a entering the deflection chamber is subjected to the action of two pressures, which may be equal or different, regulated by the auxiliary jets emitted by the nozzles 3a in a manner similar to that of the nozzles with fluid walls such as the rocket nozzle 7 which will be described hereinafter with reference to FIGURE 3. However, in FIGURE 2 it is a matter of the deflection of fluid into a pipe system, while in the case of FIGURE 3 the deflected jet 6 issues free.

The control of the aerodynamic servo-valve according to FIGURE 1 or FIGURE 2 can be effected by cold auxiliary jets. The cold gases are contained, for example, in a high pressure reservoir. Their distribution, according to the needs of the control system, can be effected by an electro-mechanical valve. The latter receives the control signals transmitted by, for example, an electric servo-motor. Various methods of operation can be envisaged. Examples are a rotating cylindrical plug having an opening of a form which gives linear increase as a function of the angle of rotation, and deflector spoilers of variable height placed in a valve having the same form as the aerodynamic servo-valve.

FIGURE 3 illustrates an example of the application of a servo-valve according to the invention to the control of the deflection of the jet 6 of the propulsion unit of a rocket. In this figure, the jet 6 emitted by the nozzle 7 is deflected by the deflector jets 8, the function of which is on the one hand to close off the chambers such as 9 and on the other to regulate the pressure prevailing therein, these two functions being in close relationship. As may be seen from the drawing, these jets are emitted by nozzles 10 and 11 in a direction inclined towards the rear in relation to the principal jet, rendering them more effective. As has already been mentioned, the secondary or deflector jets 8 are sonic or preferably supersonic.

The nozzles are supplied from a reservoir or hot gas generator represented diagrammatically at 12, through an aerodynamic servo-valve 13 such as that represented in FIGURE 2, the branches 4a and 5a of which terminate respectively at the nozzles 10 and 11. The auxiliary jets 3a of this servo-valve 13 are supplied with cold fluid contained in a reservoir 14 by way of two conduits 15 and 16, the flow rate of which is regulated by the electro-mechanical valve 17. In order to impart a value $\phi$ to the deflection of the principal jet 6 one regulates, by means of the valve 17, the flow rate of cold fluid into the conduits 15 and 16 in such manner that the auxiliary jets 3a of the servo-valve 13 distribute hot fluid delivered from the container 12 between the branches 4a and 5a of the servo-valve 13, in such a ratio as to impart to the secondary jets 8 the regulation which will produce this deflection $\phi$.

Since the fluid supplying the deflector jets must be contained in a reservoir such as 12 or taken from the rocket itself, the pressures must be very high in order either to permit of reducing the volume and weight of the reservoir or to permit the utilisation of the hot fluid of the rocket. The pressure ratios are thus very great.

The operation of the aerodynamic servo-valve, and especially that according to FIGURE 2, is the aerodynamic action of one jet upon another jet, or more precisely the impinging of the two quantities of moving fluid comprising the principal jet 1a and the auxiliary jets 3a. The forces caused by the difference of pressures existing in such an apparatus must be balanced by the momentum change in the considered direction.

Now it is unthinkable to balance the force deriving from the difference of pressure existing between, on the one hand, the great pressure in the chamber of the rocket and, on the other hand, the pressure of the atmosphere which enters into the branch of a servo-valve where the flow has to be cut off by the momentum change of the secondary jet. In order to avoid this difference of pressure the flow will firstly be expanded to atmospheric pressure by conducting it through a first sonic throat 18 and a divergent nozzle 19 (FIGURE 2). Thus in the servo-valve one will have a high supersonic flow which will lead to exaggerated losses if it passes without transformation into the conduits 4a, 5a which lead to the nozzles which intercept the rocket jet. Thus it will be of advantage to diminish the speed of flow as far as possible by recompressing the flow at the exits of the servo-valve by a convergent-divergent nozzle 20 with a second throat 21. In order to ensure a considerable diminution of the losses and stable operation of the device, it is necessary that such supersonic flow will produce a shock wave (or pressure wave) attached in the vicinity of and downstream of the second throat 21. Such a nozzle must be started, that is to say it must swallow the shock wave which is produced in the chamber 2a of the servo-valve on starting. This priming is ensured, since without deflection the passage section at the exit is double that of either throat 21, the flow being distributed uniformly in the two branches 4a and 5a, each of which comprises a convergent-divergent nozzle 20.

Thus the conduits 4a and 5a can be provided with the angles and disengagements which are necessary, without appreciable losses. Before delivery to the nozzles 10 and 11 of the rocket nozzle, re-acceleration is effected in such manner as to obtain at 8 a sonic or supersonic jet, in order to deflect the propellant jet 6 of the rocket.

It will be evident that in an aerodynamic chain of control comprising a plurality of servo-valves in cascade, the various servo-valves can be very close to one another and that convergent-divergent devices 20 are necessary only in the last servo-valve.

What is claimed is:
1. A jet deflecting device comprising:
 (a) a pure fluid valve comprising a deflection chamber having two outlet conduits, an inlet conduit opening into the chamber opposite the two outlet conduits, two auxiliary nozzles opening into the chamber on either sides of the inlet conduit, a sonic throat followed by a divergent nozzle in the inlet conduit and means for establishing a flow of fluid in the inlet conduit in order to form an incident jet of at least sonic speed issuing from the inlet conduit in the deflection chamber, and means for supplying the auxiliary nozzles selectively with fluid in order to form at least one auxiliary jet in the chamber to deflect the incident jet between the two outlet conduits;
 (b) a convergent-divergent nozzle in each outlet conduit adjacent the deflection chamber;
 (c) a jet deflecting restricted nozzle at the end of each outlet conduit; and
 (d) bends in the outlet conduits downstream of the convergent-divergent nozzles to fit the said conduits to the jet deflecting nozzles.

2. A jet deflecting device according to claim 1, wherein the auxiliary nozzles are inclined towards the rear in relation to the incident jet and the arrangement is such that the auxiliary jets have at least sonic speed.

References Cited by the Examiner

UNITED STATES PATENTS

| | | | |
|---|---|---|---|
| 3,036,430 | 5/1962 | Eggers et al. | 60—35.54 |
| 3,066,485 | 12/1962 | Bertin et al. | 60—35.54 |
| 3,122,165 | 2/1964 | Horton. | |
| 3,135,291 | 6/1964 | Kepler et al. | 60—35.54 X |
| 3,143,856 | 8/1964 | Hausmann | 137—81.5 X |
| 3,170,476 | 2/1965 | Reilly | 137—81.5 |
| 3,204,405 | 9/1965 | Warren et al. | 60—35.54 |
| 3,212,259 | 10/1965 | Kepler | 60—35.54 |

FOREIGN PATENTS 822,299  10/1959  Great Britain.

M. CARY NELSON, *Primary Examiner.*

MARK NEWMAN, *Examiner.*

A. SMITH, S. SCOTT, *Assistant Examiners.*